No. 725,361. PATENTED APR. 14, 1903.
F. E. POLZENIUSZ.
METHOD OF MAKING NITROGEN COMPOUNDS.
APPLICATION FILED MAY 20, 1902.
NO MODEL.
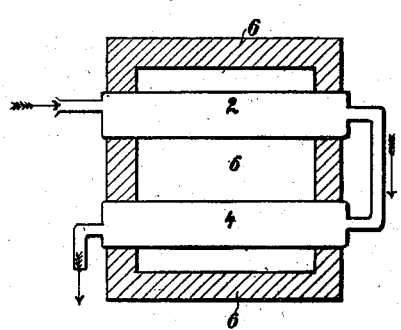
Attest
R. M. Kelly.
Wm. Rooney.
Inventor
Ferdinand E. Polzeniusz
By his atty

UNITED STATES PATENT OFFICE.

FERDINAND EDUARD POLZENIUSZ, OF FRANKFORT-ON-THE-MAIN, GERMANY.

METHOD OF MAKING NITROGEN COMPOUNDS.

SPECIFICATION forming part of Letters Patent No. 725,361, dated April 14, 1903.

Application filed May 20, 1902. Serial No. 108,226. (No specimens.)

*To all whom it may concern:*

Be it known that I, FERDINAND EDUARD POLZENIUSZ, a subject of the Emperor of Austria-Hungary, residing at Mainzerlandstrasse 259, Frankfort-on-the-Main, Germany, have invented certain new and useful Improvements in Methods of Manufacturing Nitrogen Compounds, (for which I have applied for a patent in Germany and which application is dated October 22, 1901,) of which the following is a specification.

It is known already that nitrogen compounds may be manufactured in fairly large amounts by heating barium carbid in an atmosphere of nitrogen where also small amounts of water or of various oxids or of sulfates or carbonates are present; but it was not possible to obtain these compounds on a commercial basis from other carbids—as, for instance, from the cheap and convenient calcium carbid. My method as described below overcomes this difficulty entirely.

I prepare a mixture of any carbid of alkaline earths with a chlorid of a metal and have it heated in an atmosphere of nitrogen, which is rapidly absorbed during the operation. I prefer to use calcium carbid and chlorid of calcium as ingredients of the mixture; but my method comprises also the use of other carbids in connection with chlorids of metals generally—for instance, chlorids of alkalies, alkaline earths, or other metals.

The following example shows the practical application of my method: A mixture of calcium carbid with a carefully-dried chlorid of calcium is prepared and heated to about 700° Celsius during about three hours in an atmosphere of nitrogen. For that purpose the apparatus shown in the drawing may be used.

1 denotes the inlet for the air.

2 is a vessel in which coal is contained for the purpose of separating the oxygen of the air.

3 is a connecting-pipe by which the nitrogen and the carbon monoxid (CO) formed in the vessel 2 pass to the vessel 4, where the mixture of calcium carbid and chlorid is contained, and 5 is the outlet for the gases formed during the heating operation, in the present example carbon monoxid (CO) and dioxid, ($CO_2$.)

The vessels 2 and 4 are placed in a stove 6, in which they can be submitted to the required degree of heat. After the vessels are properly heated the air is let in and the oxygen is separated from nitrogen in the vessel 2, as it forms carbon monoxid, (CO.) The free nitrogen and the carbon monoxid pass through the pipe 3 to the vessel 4, where the principal reaction takes place and the nitrogen is absorbed by the carbid, while the carbon oxid, partially changed into dioxid, escapes by the outlet 5.

The following proportions of ingredients may be made use of, although I do not limit my claims to that particular example: A mixture containing sixty-two grams of calcium carbid and 18.7 grams of calcium chlorid gives after the treatment described before a product weighing one hundred grams, which contains about 19.3 per cent. of nitrogen. If compared with the original weight of the calcium carbid, the absorption of nitrogen amounts to thirty-one per cent. The chemical constitution of the products thus obtained depends on the sort of ingredients used for the mixture. For example, a mixture of calcium carbid with calcium chlorid gives as product calcium cyanamid, ($CaCN_2$.) A mixture of calcium carbid with ferric chlorid, on the other hand, gives principally cyanid compounds.

Other methods heretofore known—for instance, experiments performed with oxids, sulfates, or carbonates used as admixtures to the calcium carbid—do not show any increase in the weight of the mixture or any absorption of nitrogen during the treatment.

The products of my process may either be used directly as manure for agricultural purposes or be transformed by known methods into other nitrogen compounds suitable for various industrial and agricultural uses. For example, the cyanamids can be treated by the Drechsel method, (*vide* Beilstein's *Handbuch der Organischen Chemie*, Vol. I, page 1436, edition 1893,) while the cyanids may be changed into potassium cyanid (KCN) by melting them with an admixture of coal and potash, (*v.* Fleck *Fabrikation Chemischer Producte*, second edition, 1880, page 81 and following.)

What I claim, and desire to secure by Letters Patent of the United States, is—

1. Method of manufacturing nitrogen compounds by preparing a mixture of carbids of alkaline earths with chlorids of metals and by heating said mixture in an atmosphere of nitrogen.

2. Method of manufacturing nitrogen compounds by preparing a mixture of carbids of alkaline earths with chlorids of alkaline earths and by heating said mixture in an atmosphere of nitrogen.

3. Method of manufacturing nitrogen compounds by preparing a mixture of calcium carbid with dry or anhydrous chlorids of alkaline earths and by heating said mixture in an atmosphere of nitrogen.

4. Method of manufacturing nitrogen compounds by preparing a mixture of calcium carbid with chlorid of calcium and by heating said mixture in an atmosphere of nitrogen.

In testimony whereof I have hereunto set my hand in the presence of two witnesses.

FERDINAND EDUARD POLZENIUSZ.

Witnesses:
 JEAN GRUND,
 BERNHARD KAISER.